April 28, 1942.  E. C. MIRK  2,280,775
METER READING DEVICE
Filed March 20, 1939  2 Sheets-Sheet 1

INVENTOR.
Earl C. Mirk
BY Philip E. Siggers
ATTORNEY.

April 28, 1942.    E. C. MIRK    2,280,775
METER READING DEVICE
Filed March 20, 1939    2 Sheets-Sheet 2
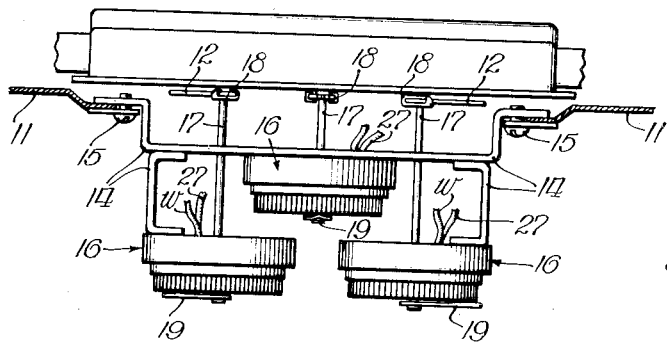
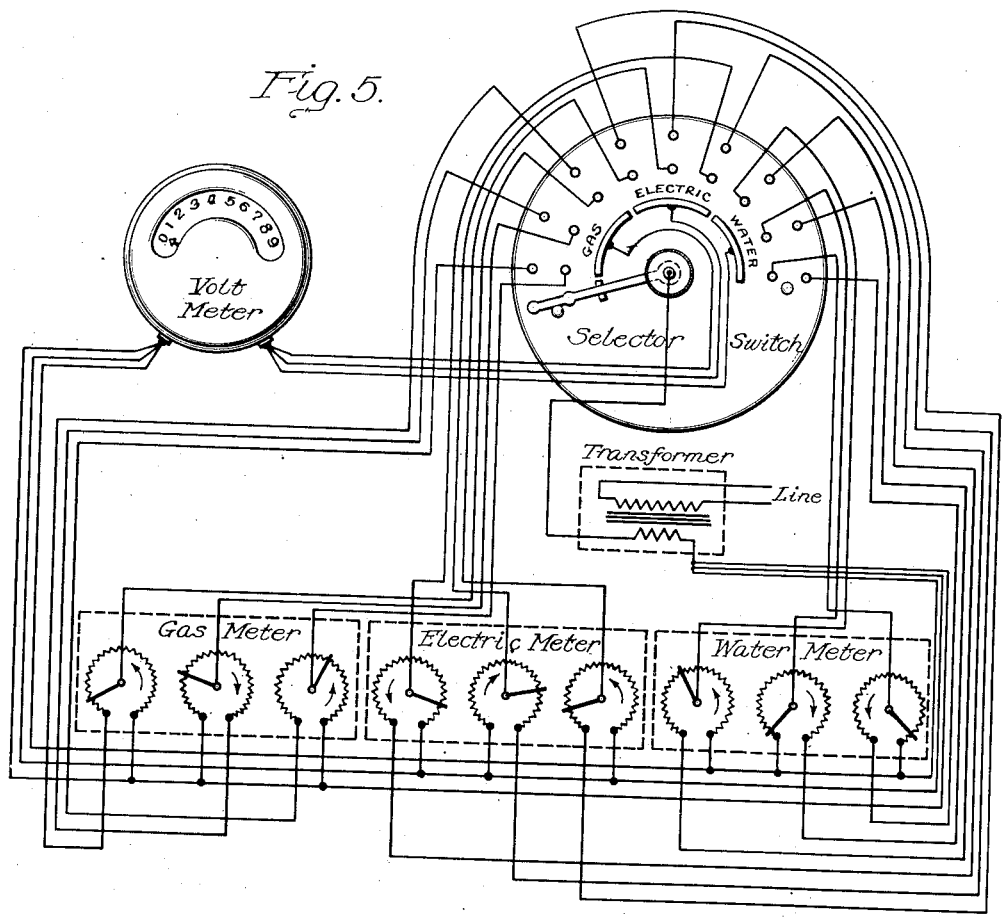
INVENTOR.
Earl C. Mirk
BY
Philip E. Siggers
ATTORNEY.

Patented Apr. 28, 1942

2,280,775

UNITED STATES PATENT OFFICE 2,280,775

METER READING DEVICE

Earl C. Mirk, Milwaukee, Wis.

Application March 20, 1939, Serial No. 263,019

9 Claims. (Cl. 177—351)

This invention relates to meter reading devices, and among other objects, aims to provide apparatus which will make it possible to read one or more standard meters from a distance, considerable or otherwise, without necessitating alterations in the constructions of the meters. Further objects are to provide a very inexpensive and easily installed apparatus which requires an absolutely negligible amount of power for its operation. The invention makes it possible to read one or more meters at any convenient point in a building or on the outside of the same, with the assurance that the reading will be absolutely accurate, and will in no way interfere with the working or accuracy of the meters. The invention has other objects which will appear from the following disclosure of a preferred embodiment.

In the accompanying drawings forming a part of this specification—

Fig. 3 is a top plan view showing the method of mounting the three rheostats of Fig. 1 on an ordinary meter;

Fig. 4 is a detail view in perspective showing the mechanical connection between a rheostat shaft and the dial arm of a meter;

Fig. 5 is another wiring diagram showing the arrangement for reading three meters, each having three dials, from a single point.

Figure 1:
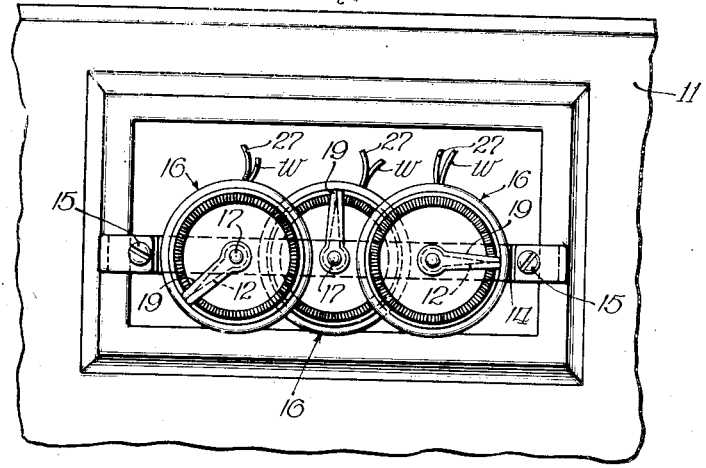
Fig. 1 is a fragmentary elevation of a meter having three dials to which three rheostats are mechanically connected in accordance with the invention.

Referring particularly to the drawings, Figs. 1, 3 and 4 show only so much of a standard meter as is necessary for an understanding of this invention. Here the meter 11 (which may be a gas, water or electrical current meter), has three dials (not shown) whose hands 12 are rigidly fixed upon the shafts 13. Normally the dials are located in a little box having a glass or other transparent protecting plate which for the purposes of this invention should be removed. A frame 14, of any convenient construction, is secured as by screws 15 to the dial box and thus provides a rigid support for rheostats or resistors 16, there being one rheostat for each of the dials. The rheostat shafts 17 are mechanically connected as by clips 18 having bendable fingers to the hands 12, as clearly shown in Fig. 4. At the outer end of each rheostat shaft 17 is a rheostat arm 19, each arm 19 being adapted to travel over the rheostat or contact to cut in or cut out the resistance thereof synchronously with the travel of the dial hands 12. In other words, the rheostat hands 19 travel with the dial arms and always have the same angular positions as the dial hands, this being shown in Fig. 1. Each rheostat is, of course, wound with a fine resistance wire, with which the rheostat arm makes electrical contact as it rotates.

While the rheostats or resistors 16 may each be of the same size as the dials, for manufacturing reasons I prefer to make them considerably larger, as shown in Fig. 3, and to stagger alternate resistors or arrange them in separate planes, as shown, so that the several shafts 17 may be parallel and may rotate freely in the frame without interference with the resistors.

Figure 2:
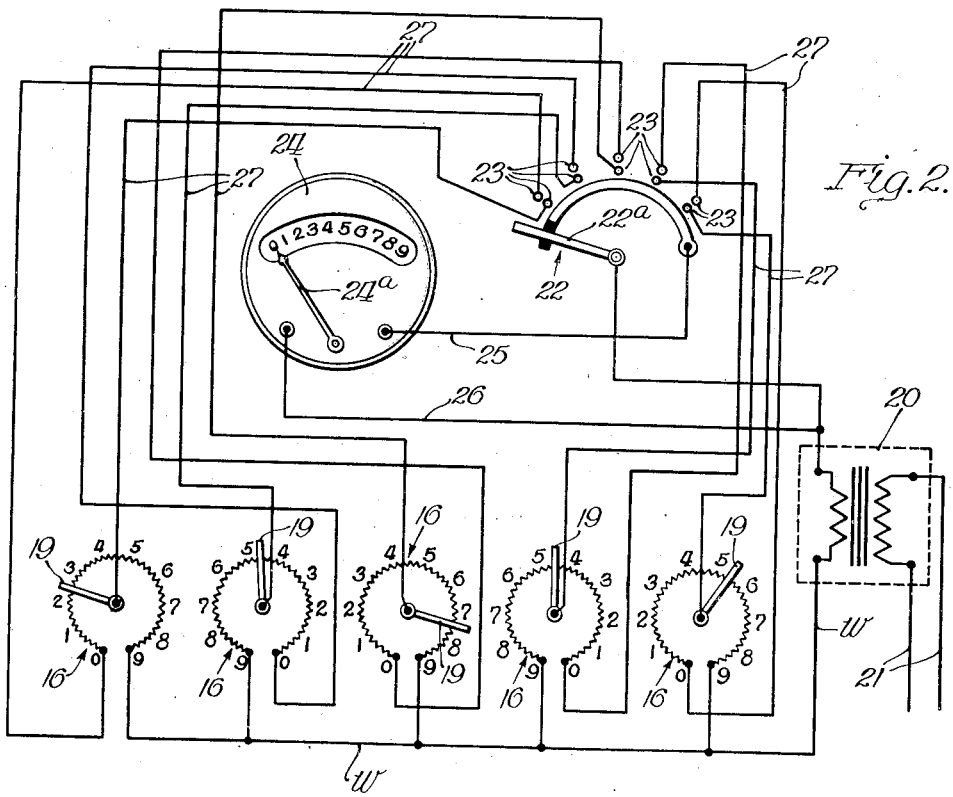
Fig. 2 is a wiring diagram showing the electrical connections when a single meter having five dials is to be read.

Now referring to Fig. 2, it is seen that five rheostats 16 are shown all of which are connected by a wire W to the low voltage side of a small transformer 20, as for example, a bell transformer. The high voltage side of the transformer is connected by leads 21 with a source of electricity. A selector switch 22 having ten contacts 23 is used to connect electrically each of the rheostats in turn with a voltmeter 24, said voltmeter being a standard article except that it has a scale reading in units from 1 to 9, as shown, instead of reading in volts. The voltmeter is connected by wires 25 and 26 respectively with one side of the selecter switch 22 and with the low voltage side of the transformer 20, and the arm 22a of the selector switch is likewise connected with the transformer 20. The contacts 23 are individually connected as by wires 27 with the several rheostats, the arms 19 of which are, of course, mechanically connected as described above, with the dial hands of the meter whose reading is desired.

From the foregoing, the operation of the device will be more or less obvious. The modified voltmeter will be placed alongside the selector switch in any convenient place in or adjacent to a building containing the meters to be read. The bell transformer may be adjacent the selector switch and voltmeter or it may be any place else in the building. The reader of the meters does not need to examine the meters at all but simply connects the rheostats individually by means of the selector switch 22, noting the readings and, of course, paying no attention to fractions. As the position of each of the rheostat arms is always the same as the position of the corresponding dial arm, and as the voltmeter is graduated to read corresponding to the angular positions of the rheostat arms, as soon as the selector switch is closed, the hand of the voltmeter 24a will jump to the position exactly corresponding with the angular position of the rheostat arm then in circuit, the energy being supplied from the transformer. Thus if the switch arm 22a is swung clockwise, as viewed in Fig. 2, to make contact with the first pan of contacts 23, the voltmeter hand will immediately jump to a position between 2 and 3 to correspond with the position of the rheostat arm of the left hand rheostat shown in Fig. 2. By closing circuits with the other contacts 23, a reading of 25755 will be had, assuming that the rheostat arms are in the positions shown.

Referring to Fig. 5, an arrangement is there shown for reading three meters, as for example, a gas meter, a water meter, and an electric meter, from one point in or near a building, a single selector switch being used with one voltmeter. The preceding description should make the working of this arrangement perfectly clear. Obviously any number of meters may be read from one point by the simple apparatus described herein.

Various modifications may be made in the described construction and arrangement of parts and the invention should not be considered as limited to the preferred embodiment herein described and shown.

Having described a preferred embodiment of the invention, what I claim as new and desire to secure by Letters Patent is:

1. A meter reading device adapted to be removably attached to a standard meter having dials and dial hands without alteration of the meter, comprising a rheostat; a rheostat arm; means mechanically connecting the rheostat hand with a dial arm so that the arm and the hand revolve together and always have the same angular position; a source of electricity; a voltmeter electrically connected with the source of electricity; the rheostat also being connected with the source of electricity; and an operator-controlled selector switch electrically connected with the voltmeter, the source of electricity, the rheostat and the rheostat arm.

2. A meter reading device comprising, in combination, shafts having attaching means; rheostats having arms driven by said shafts; said attaching means being adapted to connect the rheostat arms with the dial shafts of a standard meter; a source of electricity; means connecting the rheostats with the source of electricity; a manually operated selector switch also connected with the source of electricity and having contacts connected with the several rheostats so as to connect them individually in circuit; and a voltmeter connected with the source of electricity and the selector switch so that the reading thereof will give an indication of the angular position of the rheostat arm, and hence of the corresponding dial hand of the meter.

3. The invention according to claim 2, wherein the several dials of more than one meter have individually connected rheostats each of which is individually connected with the source of electricity and the selector switch; said selector switch being so constructed, connected and arranged as to obtain voltmeter readings from each of the dials of the meters, when said switch is closed against said contacts.

4. A meter reading device for reading standard meters having dials, comprising a voltmeter specially made to read in units of the same number as the units on a dial whose reading is desired; a source of electricity to which the voltmeter is connected; a manually controlled switch electrically connected to the source of electricity and the voltmeter and controlling passage of current through the voltmeter; and, a rheostat whose shaft is mechanically connected to the dial shaft to rotate therewith and whose windings are electrically connected to the switch and the source of electricity; said rheostat having an arm which is rotated by the rheostat shaft and which is electrically connected with a contact forming part of said switch, so that when said switch is closed against said contact the voltmeter gives a reading which exactly corresponds with the dial reading.

5. A meter attachment for meters having dials and hands revolving over said dials, comprising, in combination, a rheostat; a rotating contact arm forming a part of said rheostat; a shaft attached to said contact arm; a clip secured to said shaft and adapted to be bent around a hand of the meter thereby to cause the contact arm to rotate synchronously with the hand; and means to secure the rheostat to the meter on the outside thereof.

6. A meter attachment for meters of the type having a casing and dials and hands revolving over said dials, comprising, in combination, a resistor support; means securing the resistor support to the meter casing; a resistor secured upon said support; a rotary contact arm moving over said resistor; a shaft to which the rotary contact arm is secured; and means secured to one end of said shaft, and uniting the shaft detachably to the hand of one of the dials so that the contact arm rotates synchronously with said hand.

7. The invention according to claim 6, wherein the resistor support comprises a unitary frame which is secured to the meter casing and lies substantially outside of said casing; there being as many resistors and contact arms and shafts as there are dials, and each shaft being detachably secured to the hand of one of the dials, so that the movement of the hand of each dial is faithfully reproduced in the movement of the contact arm to which it is mechanically connected; said shafts each being rotatably mounted on said frame and the resistors each being rigidly secured to said frame, the resistors being considerably larger than the dials and arranged in at least two planes outside of the front of the meter casing, with each alternate resistor out of the plane of the resistors on either side, so that the several shafts may be parallel and may rotate without interference from the resistors on either side.

8. An attachment for meters of the type employing a plurality of dials over which hands revolve to register a reading, comprising a unitary frame; a plurality of circular resistors secured to the frame; a rotary contact arm for each resistor; quickly attachable and detachable means connecting the contact arm of each resistor to the hand of the corresponding dial; and quickly attachable and detachable means securing the frame upon the front of the meter casing directly over the opening through which the dials are normally read.

9. The invention according to claim 6 wherein a source of electricity, a switch, a meter giving a reading proportional to the flow of electricity, and conductors are provided; the conductors electrically connecting the source of electricity with the last named meter and with the switch, the resistor and the contact arm, so that the last named meter, when the switch is closed, gives a reading of the position of the contact arm.

EARL C. MIRK.